United States Patent
Kawasumi (10) Patent No.: US 10,670,947 B2
(45) Date of Patent: Jun. 2, 2020

(54) IMAGE PROJECTION APPARATUS THAT PROJECTS SUPERIMPOSED IMAGES

(71) Applicant: CANON KABUSHIKI KAISHA, Tokyo (JP)

(72) Inventor: Takehito Kawasumi, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/059,549

(22) Filed: Aug. 9, 2018

(65) Prior Publication Data

US 2019/0052836 A1    Feb. 14, 2019

(30) Foreign Application Priority Data

Aug. 10, 2017 (JP) ................................. 2017-154903

(51) Int. Cl.
*G03B 21/00* (2006.01)
*H04N 5/74* (2006.01)
(Continued)

(52) U.S. Cl.
CPC ....... *G03B 21/005* (2013.01); *G03B 21/2053* (2013.01); *H04N 5/7441* (2013.01);
(Continued)

(58) Field of Classification Search
CPC ...... H04N 5/7441; H04N 9/3138; H04N 9/31; H04N 5/74; G03B 21/2053; G03B 21/20
See application file for complete search history.

(56) References Cited

U.S. PATENT DOCUMENTS 9,462,215 B2    10/2016   Gorny et al.
2004/0036813 A1*  2/2004  Matsuda ................. H04N 5/74
                                                         348/744
(Continued)

FOREIGN PATENT DOCUMENTS

GB          2317290 A      3/1998
JP       2010256674 A     11/2010
WO    WO-2017066207 A1 *  4/2017    ......... G02B 27/0961

OTHER PUBLICATIONS

Combined Search and Examination Report issued in GB Appln. No. 1812811.6 dated Feb. 8, 2019.

*Primary Examiner* — Cara E Rakowski
*Assistant Examiner* — Magda Cruz
(74) *Attorney, Agent, or Firm* — Rossi, Kimms & McDowell LLP (57) ABSTRACT

An image projection apparatus includes an image signal inputter configured to input an image signal, a first light modulation element configured to modulate light from a light source, a second light modulation element configured to modulate light from the first light modulation element, an optical system configured to guide a projection image in which an image formed by the light modulated by the first light modulation element and an image formed by the light modulated by the second light modulation element are superimposed on each other to a projection optical system, a first driver configured to drive one of the first and second light modulation elements based on the image signal, and a second driver configured to drive the other of the first and second light modulation elements based on a luminance correction data irrelevant to the image signal.

7 Claims, 5 Drawing Sheets

(51) Int. Cl.
*H04N 9/31* (2006.01)
*G03B 21/20* (2006.01)
*G03B 21/26* (2006.01)

(52) U.S. Cl.
CPC ......... *H04N 9/3126* (2013.01); *H04N 9/3138* (2013.01); *H04N 9/3182* (2013.01); *H04N 9/3185* (2013.01); *G03B 21/26* (2013.01)

(56) References Cited

U.S. PATENT DOCUMENTS

| | | |
|---|---|---|
| 2006/0066547 A1 | 3/2006 | Nitta et al. |
| 2014/0104581 A1* | 4/2014 | Yoshimura ............. G03B 21/26 353/30 |
| 2014/0104582 A1* | 4/2014 | Mori .................... H04N 9/3185 353/30 |
| 2015/0195424 A1* | 7/2015 | Mizushiro ............ H04N 9/3147 345/600 |
| 2016/0112689 A1* | 4/2016 | Okamoto ............. H04N 9/3147 348/745 |
| 2016/0261832 A1 | 9/2016 | Gorny et al. |
| 2017/0163948 A1* | 6/2017 | Morisawa ............. G06F 3/1446 |
| 2017/0310937 A1* | 10/2017 | Wada .................. H04N 9/3179 |
| 2018/0139422 A1* | 5/2018 | Moule .................. H04N 9/3182 |

\* cited by examiner

IMAGE PROJECTION APPARATUS THAT PROJECTS SUPERIMPOSED IMAGES

BACKGROUND OF THE INVENTION

Field of the Invention

The present invention relates to an image projection apparatus (projector) that modulates light through a light modulation element, and projects an image.

Description of the Related Art

In a projection mapping that projects an image from a projector onto a three-dimensional object, such as a building, causes uneven brightness in the projection image viewed by a viewer, when areas on a projection surface on the three-dimensional object have different reflectances due to an angle, a material, etc. In this case, a luminance correction that electrically lowers the luminance of image part projected in a high-reflectance area down to the luminance of image part in a low-reflectance area. However, this luminance correction reduces the number of tones (gradations) used to express the projection image, and the tone property that smoothly changes the tone deteriorates.

The multi-projection that connects a plurality of images projected from a plurality of projectors to each other and create a large image provides edge blending in superimposing the peripheral parts of the plurality of projection images on each other. The edge blending can make inconspicuous the connected part in the projection images by applying the electric luminance correction to the peripheral part in each projection image, which lowers the luminance toward the edge of the projection image. When the connected part in the projection image is dark part displayed in black etc., a similar luminance correction is performed by electrically raising the black luminance level. The contrast of the projection image lowers as the black luminance level is raised.

Japanese Patent Laid-Open No. 2010-256674 discloses a projector that optically lowers the luminance of the peripheral part in the projection image by providing a light shield having a specific shape in an illumination optical system that guides light from a light source to a light modulation element. A filter having a partially different transmittance rather than the light shield can correct the uneven brightness caused by the reflectance difference for each area on the three-dimensional object in the projection mapping.

However, the light shield or filter needs to be highly accurately positioned in the illumination optical system. Since it is also necessary to change the shape in the light shield or the transmittance for each part in the filter based on the reflectance for each content (pattern) in the projection image and area on the three-dimensional object, the light shield and filter are less versatile than the electric correction.

SUMMARY OF THE INVENTION

The present invention provides an image projection apparatus that can maintain the tone property and the contrast and provide a versatile luminance correction.

An image projection apparatus according to one aspect of the present invention includes an image signal inputter configured to input an image signal, a first light modulation element configured to modulate light from a light source, a second light modulation element configured to modulate light from the first light modulation element, an optical system configured to guide a projection image in which an image formed by the light modulated by the first light modulation element and an image formed by the light modulated by the second light modulation element are superimposed on each other to a projection optical system, a first driver configured to drive one of the first and second light modulation elements based on the image signal, and a second driver configured to drive the other of the first and second light modulation elements based on a luminance correction data irrelevant to the image signal.

Further features of the present invention will become apparent from the following description of exemplary embodiments with reference to the attached drawings.

DESCRIPTION OF THE EMBODIMENTS

A description will now be given of embodiments of the present invention, with reference to the accompanying drawings.

First Embodiment

Figure 1:
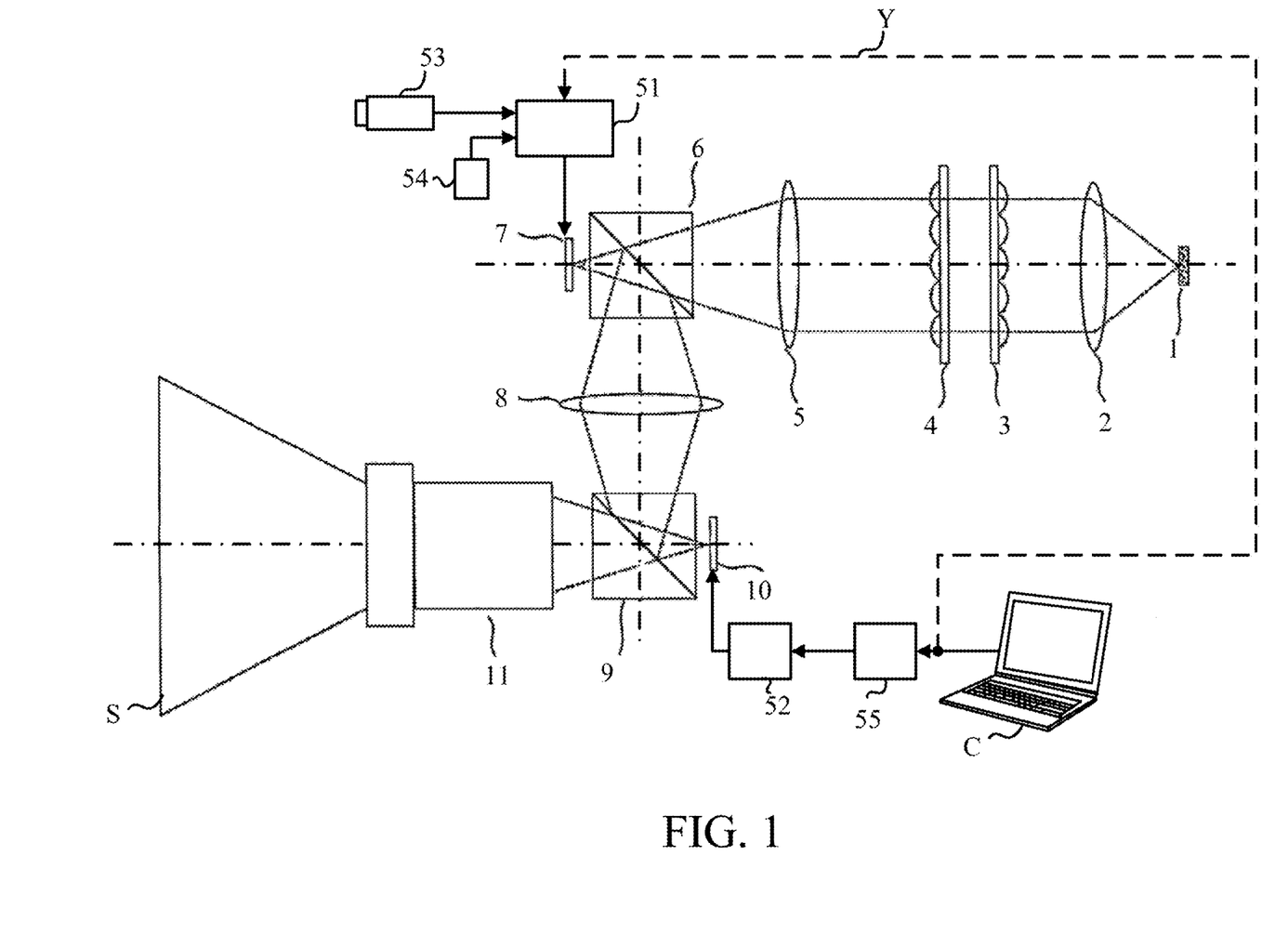
FIG. 1 is a block diagram of a structure in a projector according to a first embodiment of the present invention.

FIG. 1 illustrates a structure of a projector according to a first embodiment of the present invention. This embodiment uses a second light modulation element 10 as one of the first and second light modulation elements 7 and 10 and the first light modulation element 7 as the other of the first and second light modulation elements 7 and 10, as described later.

A diverged light flux or beam (first light) emitted from a light source 1 is condensed by a condenser lens 2, and emitted as a collimated light flux. The light source 1 may use an ultrahigh pressure mercury lamp, a xenon lamp, a light emitting diode, a laser, a fluorite body, etc. The collimated light flux emitted from the condenser lens 2 is divided into a plurality of light fluxes by a first lens array 3, and the plurality of light fluxes are condensed and form a plurality of light source images near a second lens array 4. The light fluxes emitted from the second lens array 4 are condensed by the condenser lens 5, are superimposed on the first light modulation element 7, and form a uniform luminance distribution. The first light modulation element 7 is a reflection type liquid crystal panel.

The light flux emitted from the condenser lens 5 enters a first polarization beam splitter (PBS) 6. An S-polarization component in the light flux that has entered the first PBS 6 is reflected by the polarization separating surface in the first PBS 6 and guided to the outside of the optical path. A P-polarization component transmits through the polarization separating surface and enters the first light modulation element 7. The first light modulation element 7 as the reflection type liquid crystal panel controls a polarization state of the incident light for each pixel or modulates the incident light. A first driver 51 drives the first light modulation element 7 for modulating the light. A light flux (second light) modulated by the first light modulation element 7 and emitted as the S-polarized light is reflected on the polarization separating surface in the first PBS 6 and enters a relay lens (imaging optical system) 8. On the other hand, a light flux that is not modulated by the first light modulation element 7 and emitted as the P-polarized light transmits the polarization separating surface in the first PBS 6 and returns to the light source side.

A light flux (S-polarized light) condensed by the relay lens 8 is reflected on a second PBS 9, and enters a second light modulation element 10. The second light modulation element 10 also includes a reflection type liquid crystal panel and can modulate the incident light for each pixel. A second driver 52 drives the second light modulation element 10 for modulating the light. The light flux that has been modulated by the second light modulation element 10 and emitted as the P-polarized light transmits the second PBS 9, enters a projection lens (projection optical system) 11, is enlarged and projected on a projection surface S, such as a screen (not illustrated) and a three-dimensional object, by the projection lens 11. Thereby, a projection image (displayed image) as an image is displayed on the projection surface S. The light flux that is not modulated by the second light modulation element 10 and is emitted as the S-polarized light is reflected no the second PBS 9 and returns to the light source side.

The second light modulation element 10 is disposed at a position optically conjugate with the first light modulation element 7 with respect to the relay lens 8. Therefore, the light distribution image on the first light modulation element 7 is formed on the second light modulation element 10 by the relay lens 8. The projection surface S has an optically conjugate relationship with the second light modulation element 10 with respect to the projection lens 11. Therefore, an image in which the image formed by the light modulated by the first light modulation element 7 is superimposed on the image formed by the light modulated by the second light modulation element 10 is formed as the projection image on the projection surface S.

The second driver 52 generates a drive signal based on an image signal ("input image signal" hereinafter) input from an image supplying apparatus C, such as a personal computer through an image inputter (image signal input) 55, gives the drive signal to the second light modulation element 10, and drives it.

On the other hand, the first driver 51 generates a signal irrelevant to the luminance correcting signal or input image signal, which will be described later, based on an image signal output from the camera 53 that captures an image of the projection surface S before the image is projected or while the image is being projected. A more specific example of the luminance correcting signal will be described later. The drive signal generated based on the luminance correcting signal is given to the first light modulation element 7 so as to drive it. The first driver 51 may previously store luminance correction data corresponding to the luminance correcting signal (which is data irrelevant to the input image signal) in a memory 54 (or storage), and the first light modulation element 7 may be driven by generating the drive signal based on the luminance correction data acquired from the memory 54.

Alternatively, the memory 54 may store reference luminance correction data (template), and the luminance correction data may be corrected based on the output of the camera 53 the input of the user while the first light modulation element 7 is driven based on the luminance correction data. This configuration can easily correct the luminance correction data based on the actual projection image or the image formed by the light modulated by the first light modulation element 7.

Figure 2A:
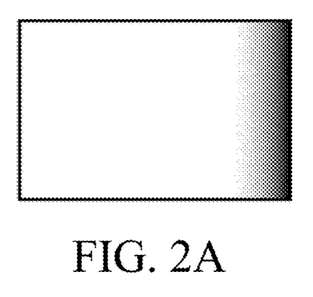
FIGS. 2A to 2C illustrate luminance distributions on each conjugate plane according to the first embodiment.

Referring now to FIGS. 2A to 5B, a description will be given of the edge blending in the multi-projection using a plurality of (two) projectors according to this embodiment. FIG. 2A illustrates an image formed by the light modulated by the first light modulation element 7 (luminance correcting signal or the image having a luminance change expressed by the luminance correction data or referred to as a "luminance correcting image" hereinafter). This luminance correcting image is an image having a luminance change (gradation) in which the luminance of the image peripheral part is lower as a position approaches to an image edge. This luminance correcting image (or the luminance correcting signal) is an image (signal) irrelevant to the input image signal.

Figure 2B:
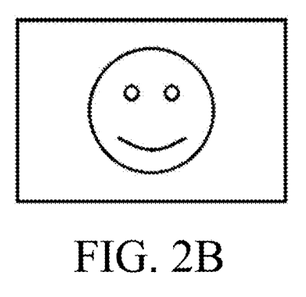
Figure 2C:
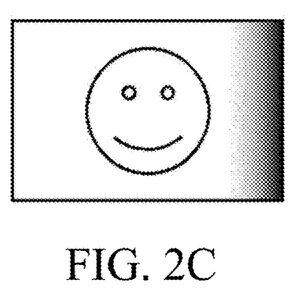

FIG. 2B illustrates an image formed by the light modulated by the second light modulation element 10 (in other words, an image corresponding to the input image signal or referred to as a main image in the following description). FIG. 2C illustrates the projection image displayed on the projection surface S in which the luminance correcting image is superimposed on the main image. The projection image is an image in which the luminance is corrected to the peripheral part in the main image by the luminance correcting image.

Figure 3A:
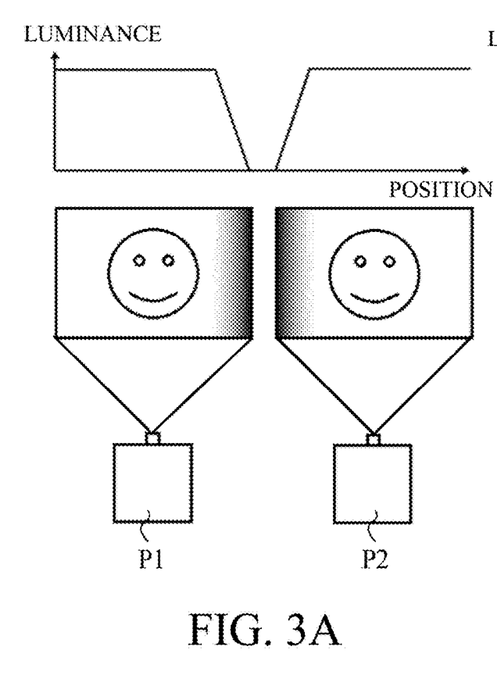
FIGS. 3A and 3B illustrate an application example to the edge blending according to the first embodiment.
Figure 3B:
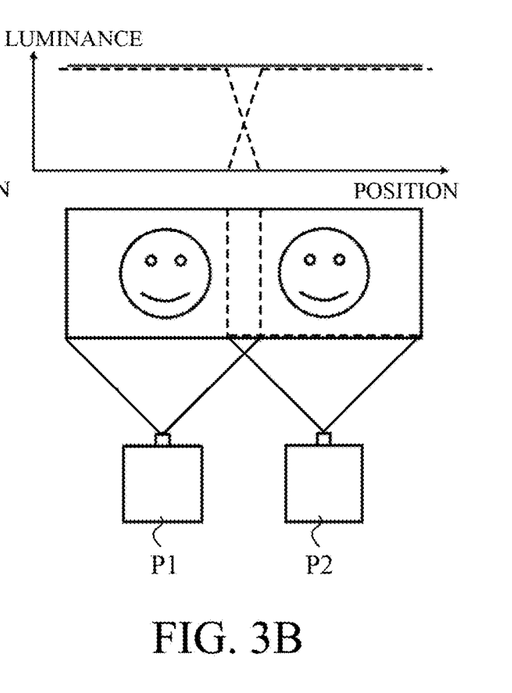

FIGS. 3A and 3B illustrate effects of the edge blending in the multi-projection using the two projectors according to this embodiment. FIG. 3A illustrates the two projection images projected by the two projectors and each corresponding luminance distribution. FIG. 3B illustrates connected projection images ("combined projection image" hereinafter) and the luminance distribution (solid line). The luminance distribution illustrated by a broken line in FIG. 3B illustrates the luminance distributions of the two projection images illustrated in FIG. 3A.

As illustrated in FIG. 3A, two projectors P1 and P2 according to this embodiment project the projection images on the target screen S in which the luminance correction is applied to each peripheral parts as illustrated in FIG. 2C, and the peripheral parts (connected parts) are superimposed on each other as illustrated in FIG. 3B. Thereby, as illustrated by a solid line in FIG. 3B, the connected part in the combined projection image has a luminance equivalent with those of other parts, and becomes less conspicuous.

Figure 4A:
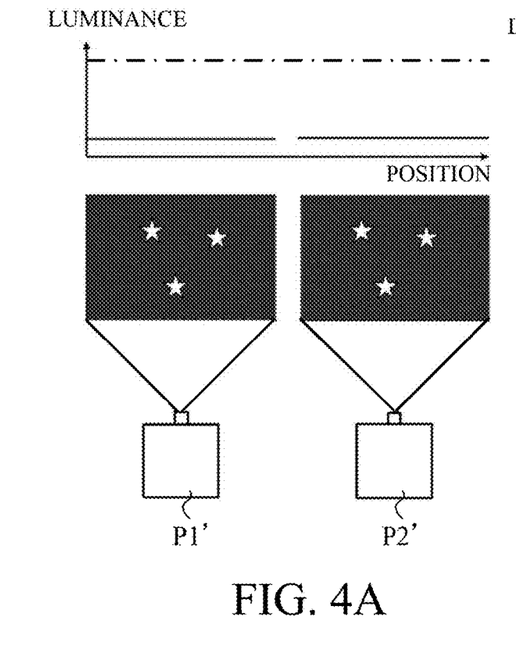
FIGS. 4A and 4B illustrate a problem in the conventional edge blending to dark part.
Figure 4B:
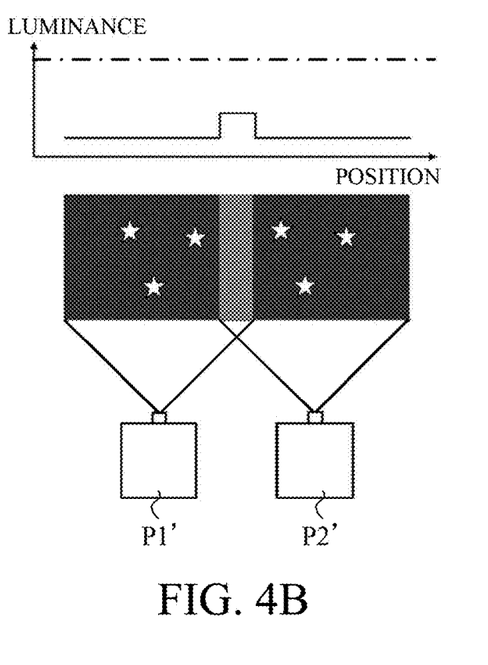

The edge blending with the two conventional projectors corrects the luminance in the connection part in each projection image through electric luminance correction processing to the input image signal. This is similarly applied to a case where the two projection images have wide black areas and bright parts among them, such as a starry night sky image illustrated in FIG. 4A. FIG. 4A illustrates the two projection images projected by the two conventional projectors P1' and P2' where each solid line illustrates a luminance distribution of the black area and an alternate long and short dash line illustrates a white luminance level. When the connection parts of the two projection images having wide black areas are superimposed on each other without the luminance correction, the luminance lift occurs in which the luminance (solid line) of the superimposed connection part is doubled as illustrated in FIG. 4B, and the connection part stands out in the combined projection image.

Figure 5A:
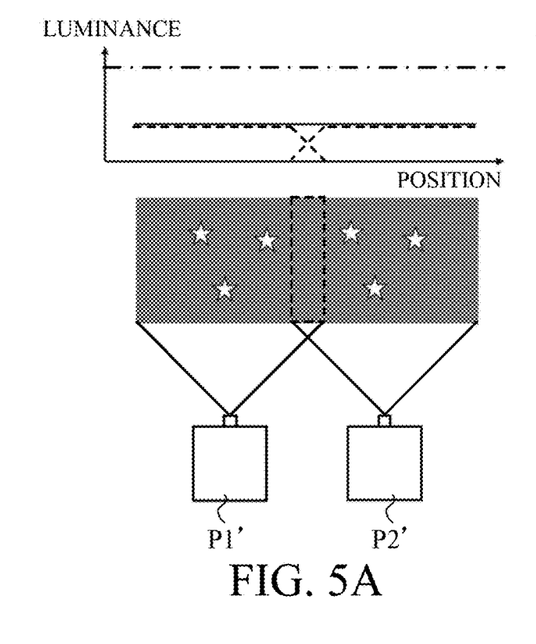
FIGS. 5A and 5B illustrate an effect in the edge blending according to the first embodiment.

As a solution for this problem, the luminance is corrected to the connection part after the black luminance level of each of the two projection images (input image signals) illustrated in FIG. 4A is approximately doubled, as illustrated in FIG. 5A. For example, where the black luminance illustrated by the solid line in FIG. 4A is set to 100, the black luminance illustrated by the solid line in FIG. 5A is about 200. Thereby, the luminance lift in the connection part in the combined projection image can be prevented from standing out. In FIG. 5A, a broken line illustrates a luminance distribution of the black area in each of the two projection images, and a solid line illustrates the luminance distribution of the black area in the combined projection image. An alternate long and short dash line illustrates a white luminance level.

However, when the black luminance level is raised in the combined projection image as illustrated in FIG. 5A, and the contrast lowers. Since the black luminance level is raised, the number of tones for displaying part brighter than black reduces and the tone property deteriorates.

On the other hand, this embodiment sets the first light modulation element 7 and the second light modulation element 10 to the optically conjugate relationship with respect to the relay lens 8 as described above and can provide edge blending while restraining the contrast and the tone from lowering. A description will now be given of the reasons.

This embodiment forms a luminance correcting image for edge blending through the first light modulation element 7 using the luminance correcting signal irrelevant to the input image signal, and forms a main image corresponding to the normal input image signal through the second light modulation element 10. In other words, the input image signal does not receive the electric luminance correction processing for the edge blending. Thereby, the main image in which the tone property does not deteriorate can be projected onto the projection surface S.

Since the first light modulation element 7 and the second light modulation element 10 are optically arranged in series, the contrast of the entire projector can be made higher than that with only the second light modulation element 10. For example, assume that the contrast obtained with the second light modulation element 10 and the second PBS 9 is set to 100:1 and the contrast obtained with the first light modulation element 7 and the first PBS 6 is set to 100:1. Then, the contrast of the entire projector can be 10000:1. In other words, the contrast can be 100 times as high as that with the second light modulation element 10 without the first light modulation element 7.

Figure 5B:
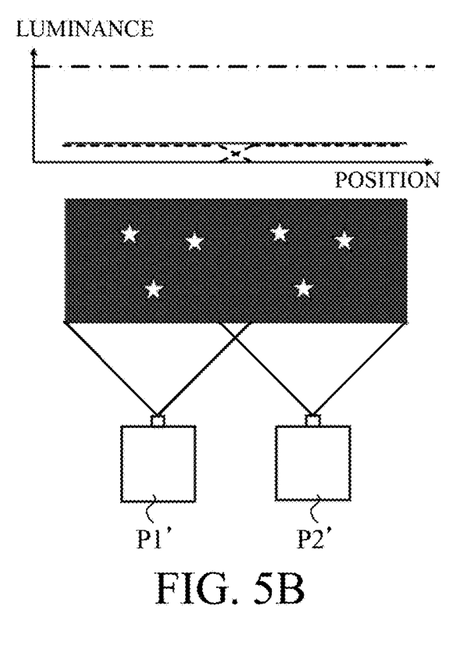

Thereby, even when the black level in the projection image is approximately doubled in the edge blending where the projection images having wide black areas are connected as illustrated in FIG. 5B, the luminance lift in the entire combined projection image can be reduced down to one fiftieth as high as that with the electric correction processing to the input image signal. The two broken lines in FIG. 5B illustrate luminance distributions of the black areas in the two projection images in which the luminance correcting image is superimposed on the main image, and the solid line illustrates the luminance distribution of the black area in the combined projection image. The tone property of the projection image can be sufficiently secured.

As described above, this embodiment displays the combined projection image by connecting the two projection images and by superimposing the luminance correcting image formed with the luminance correcting signal or luminance correction data irrelevant to the input image signal, on the main image formed based on the input image signal. Thereby, this embodiment secures the original tone property and contrast in the main image (or maintains the tone property and contrast in the projection image) and provides the luminance correction that makes inconspicuous the luminance lift in the connection part in the combined projection image by superimposing the luminance correcting image on the main image. In addition, this embodiment can easily form a variety of images as the luminance correcting image through the first light modulation element 7 and provide the versatile luminance corrections.

According to this embodiment, the first light modulation element 7 forms the luminance correcting image and the subsequent second light modulation element 10 forms the main image. Alternatively, the first light modulation element 7 forms the main image and the second light modulation element 10 forms the luminance correcting image. This configuration can also provide an effect similar to that of this embodiment. The luminance correcting image may often have a frequency lower than that of the main image. Hence, the relay lens 8 that determines the conjugate relationship (imaging relationship) between the first and second light modulation elements 7 and 10 may have a lower imaging performance when the first modulation element 7 forms the luminance correcting image as in this embodiment rather than that when the second light modulation element 10 forms the luminance correcting image. As long as the relay lens 8 has a low imaging performance, the optical configuration of the relay lens 8 can be made simpler and the relay lens 8 (or finally the entire projector) can be made smaller.

According to this embodiment, the first driver 51 drives the first light modulation element 7 so as to form the luminance correcting image by using the luminance correcting signal or the luminance correction data. Alternatively, this embodiment may acquire a luminance signal ("image luminance signal" hereinafter) in the input image signal that includes a color (difference) signal and the luminance signal as illustrated by broken lines in FIG. 1, and form the luminance correcting image through the first light modulation element 7 by using the luminance correcting signal (or luminance correction data) and the image luminance signal. In this case, since the luminance correcting image is superimposed on the main image, the luminance correction for the edge blending is provided and the dynamic range of the projection image is enlarged.

Second Embodiment

A description will be given of a projector according to a second embodiment of the present invention. The optical configuration of the projector according to this embodiment is similar to that of the projector according to the first embodiment. This embodiment forms the luminance correcting image on the first light modulation element 7 in which the luminance varies with the luminance and the reflectance for each area in the three-dimensional object (target plane) in the projection mapping onto the three-dimensional object. This luminance correcting image is an image in which the luminance of image part corresponding to an area with a high luminance or reflectance on the three-dimensional object is made lower than that of image part corresponding to an area with a low luminance or reflectance on the three-dimensional object.

The first driver 51 acquires luminance distribution data representing the luminance (or reflectance) for each area in the three-dimensional object, for example, by using the image signal from the camera 53 that has captured an image of the three-dimensional object. The first driver 51 may acquire reflectance distribution data stored in the memory 54 that previously stores the measured reflectance (or luminance) of the three-dimensional object. The luminance correcting signal or luminance correction data (or signal or data irrelevant to the input image signal) is generated from the luminance distribution data or the reflectance distribution data, and the drive signal is generated for the first light modulation element 7 by using the luminance correcting signal or the luminance correction data. Thereby, the above luminance correction data can be formed on the first light modulation element 7.

Figure 6B:
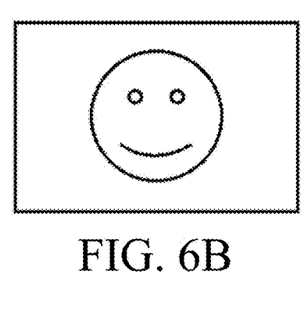
Figure 7A:
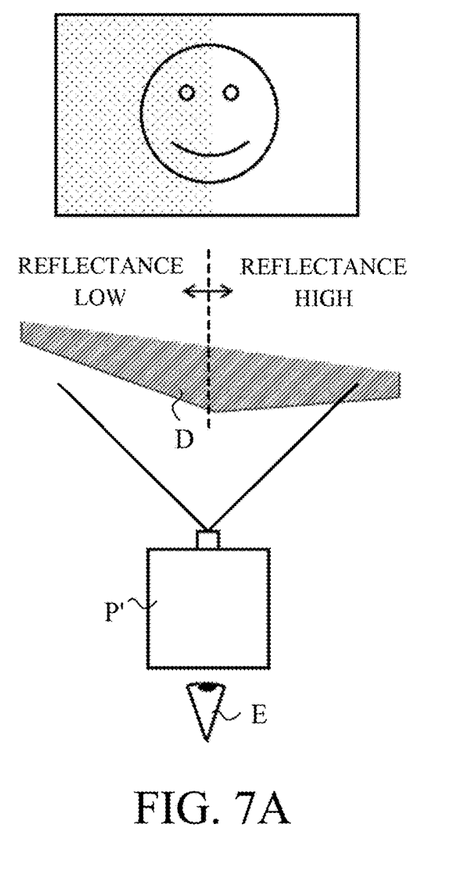
FIGS. 7A and 7B illustrate an application example to the projection mapping according to the second embodiment.

FIG. 7A illustrates a view of the projection image by the observer when the image is projected on a three-dimensional object D from the conventional projector P'. A right half area on the three-dimensional object D faces the projection lens in the projector P' and the observer E and has a high reflectance (or luminance). On the other hand, a left half area on the three-dimensional object D inclines to the projection lens and the observer E and has a lower reflectance than that of the right half area. When an image illustrated in FIG. 6B in which no luminance correction is performed based on the reflectance for each area on the three-dimensional object D is projected on the three-dimensional object D, the observer can view the projection image having an uneven brightness as illustrated in FIG. 7A, in which the left half image part is darker than the right half image part.

Figure 6A:
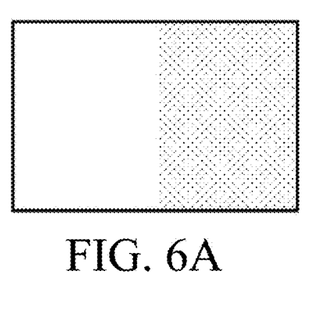
FIGS. 6A to 6C illustrate a brightness distribution on each conjugate plane according to a second embodiment of the present invention.

FIG. 6A illustrates the luminance correcting image formed by the light modulated by the first light modulation element 7 in the projector P according to this embodiment. In this luminance correcting image, the luminance of the right half area is lower than that of the left half area in comparison with the three-dimensional object D in which the reflectance of the right half area is higher than that of the left half area as described above. This luminance correcting image (or luminance correcting signal) is an image (signal) irrelevant to the input image signal.

Figure 6C:
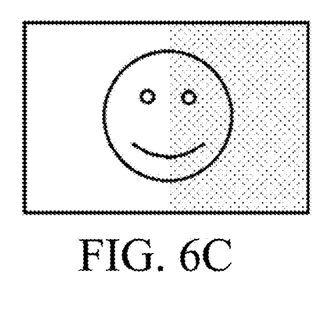
Figure 7B:
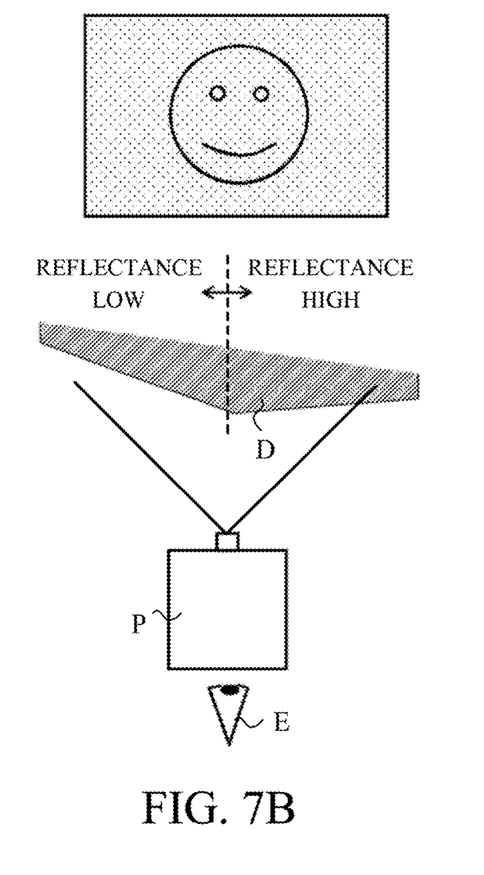

FIG. 6B illustrates the main image formed by the light modulated by the second light modulation element 10 driven based on the input image signal. FIG. 6C illustrates the projection image made by superimposing the luminance correcting image on the main image. When the projection image, in which the luminance correction is made based on the reflectance for each area of the three-dimensional object D, is projected on the three-dimensional object D as illustrated in FIG. 7B, the observer can view the projection image that reduces uneven brightness illustrated in FIG. 7A.

This embodiment thus projects the projection image on the projection surface, in which the luminance correcting image that can correct the luminance based on the reflectance for each area on the projection surface is superimposed on the main image. Thereby, this embodiment can provide the observer with the projection image in which the uneven brightness is reduced which is caused by a difference of the reflectance for each area on the projection surface.

In order to reduce the uneven brightness in the projection image caused by the reflectance difference for each area on the projection surface, the conventional projector performs the edge blending described in the first embodiment and the luminance correcting processing for the input image signal. Thereby, the tone property of the projection image deteriorates.

On the other hand, this embodiment secures the original tone property and contrast in the main image (or maintains the tone property and contrast in the projection image), and reduces the uneven brightness in the projection image caused by the reflectance difference for each area on the projection surface through the luminance correcting image. Since a wide variety of images as the luminance correcting images can be easily formed on the first light modulation element 7, this embodiment can provide the versatile luminance correction.

While FIGS. 6A to 6C and 7B illustrate the three-dimensional object D that has two plane areas with different reflectances, the luminance of the projection image can be similarly corrected in the image projection on the three-dimensional object having another shape, such as a curved or spherical screen.

Third Embodiment

Figure 8:
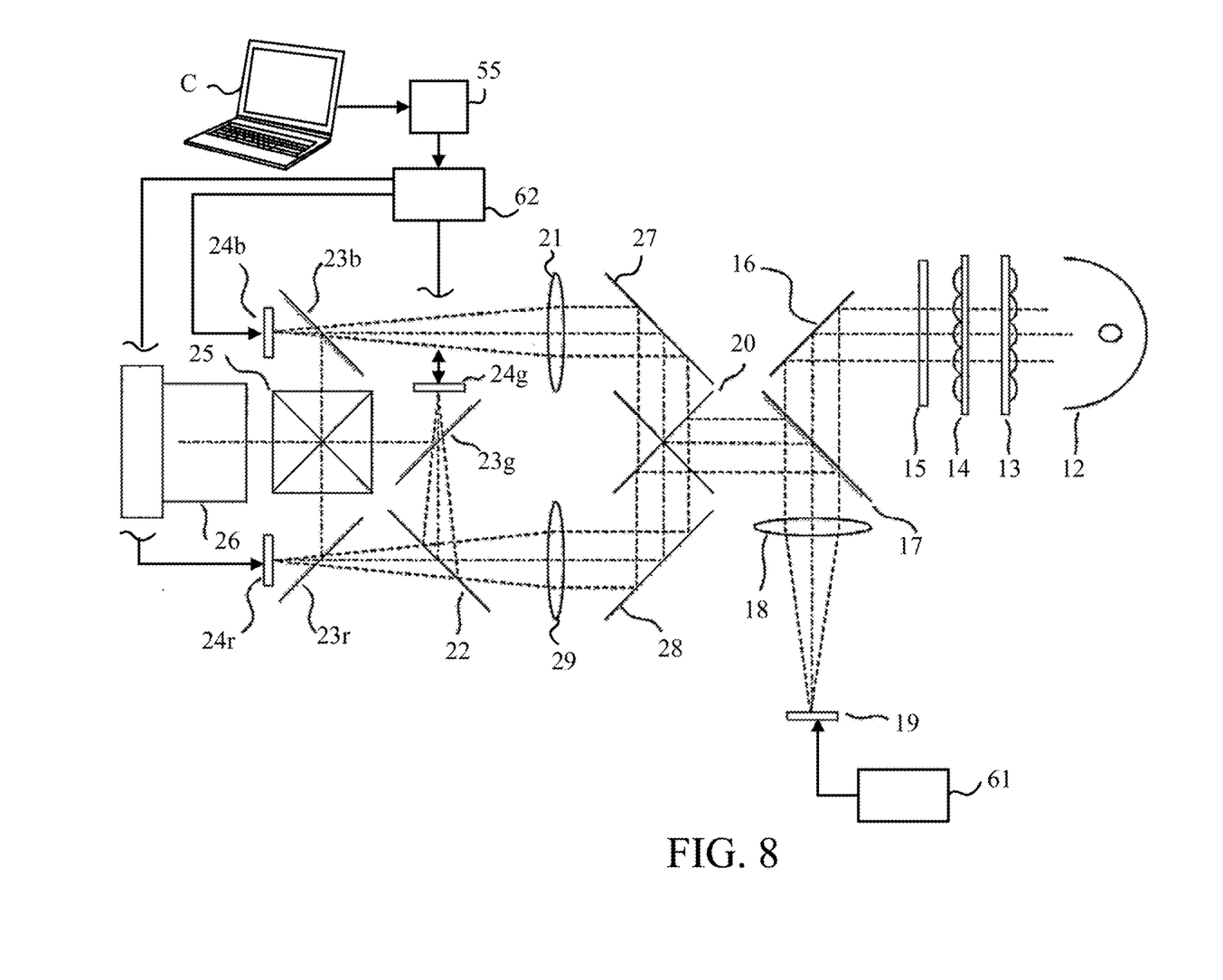
FIG. 8 is a block diagram of a structure in a projector according to a third embodiment of the present invention.

Referring to FIG. 8, a description will be given of another illustrative projector that can superimpose a luminance correcting image on a main image and project the resultant image as described in the first and second embodiments.

A collimated light flux (first light) emitted from a light source lamp 12, such as an ultrahigh mercury lamp and a xenon lamp, is divided into a plurality of light fluxes by a first lens array 13, and the plurality of light fluxes are condensed and form a plurality of light source images near a second lens array 14. The light source lamp may be replaced with another light source, such as a light emitting diode, a laser, and a fluorite body. The light fluxes emitted from the second lens array 14 enter a polarization conversion element 15 and are converted into polarized light having a specific polarization direction (which is P-polarized light in this embodiment).

A plurality of light fluxes emitted from the polarization conversion element 15 are reflected on a deflection mirror 16, transmit a first PBS 17, and enter a first condenser lens 18. The plurality of light fluxes are condensed by the condenser lens 18, are superimposed on a first light modulation element 19, and form a uniform luminance distribution. The first light modulation element 19 is a reflection type liquid crystal panel driven in accordance with the luminance correcting signal by a first driver 61 similar to the first and second embodiments, and forms a luminance correcting image by modulating the incident light. The first PBS 17 is a wire grid type polarization splitting element advantageous to the contrast improvement.

A light flux (second light) modulated by the first light modulation element 19 and emitted as the S-polarized light is reflected on the first PBS 17 and enters a cross dichroic mirror 20. On the other hand, a light flux that is not modulated by the first light modulation element 19 and emitted as the P-polarized light transmits through the first PBS 17 and returns to the light source side.

The cross dichroic mirror 20 separates white light guided via the above optical path from the light source lamp 12 into blue light, green light, and red light, and guide these light fluxes to corresponding optical paths. The blue light is reflected on a deflection mirror 27, is condensed by a second condenser lens 21, transmits as P-polarized light through a second blue-use PBS 23b, and enters a second blue-use light modulation element 24b. The second PBS 23b is also a wire grid type polarization splitting element.

The green light and red light are reflected on the deflection mirror 28, are condensed by a third condenser lens 29, enter a dichroic mirror 22, and are separated into the green light and the red light. The green light transmits as the P-polarized light through a second green-use PBS 23g and enters a second green-use light modulation element 24g. The red light transmits as the P-polarized light through a second red-use PBS 23r and enters a second red-use light modulation element 24r. The three second PBSs 23b, 23g, and 23r also include wire grid type polarization splitting elements.

The three second light modulation elements (corresponding to the one of the light modulation elements) 24b, 24g, and 24r are reflection type liquid crystal panels driven by the second driver 62 in accordance with the blue signal, the green signal, and the red signal in the input image signal as in the first and second embodiments. Thereby, the blue light, the green light, and the red light are generated so as to form the main image as a full color image.

The light fluxes modulated by the second light modulation elements 24b, 24g, and 24r and emitted as S-polarized light are reflected on the second PBS 23b, 23g, and 23r, enter a cross dichroic prism 25 that combines these light fluxes, and then enter a projection lens 26. The color combined light entering the projection lens 26 are enlarged and projected on a projection surface, such as a screen (not illustrated). Thereby, the projection image (displayed image) as an image is displayed on the projection surface. The light fluxes that are not modulated by the second light modulation elements 24b, 24g, and 24r and are emitted as the P-polarization light transmit the second PBS 23b, 23g, and 23r and return to the light source side.

Since even this embodiment arranges the first light modulation element 19 and the three second light modulation elements 24b, 24g, and 24r optically in series. Moreover, the first light modulation element 19 and the second light modulation elements 24b, 24g, and 24r are arranged at optically conjugate positions with respect to the first and second condenser lenses (imaging optical systems) 18, 21, and 29. Hence, the light distribution image on the first light modulation element 19 is formed on the second light modulation element 24b, 24g, and 24r. The projection surface has an optically conjugate relationship with the second light modulation elements 24b, 24g, and 24r with respect to the projection lens 26. Therefore, the image made by superimposing the luminance correcting image formed by the light modulated by the first light modulation element 19 on the main image formed by the light modulated by the second light modulation elements 24b, 24g, and 24r is projected as the projection image on the projection surface. Thereby, this embodiment can maintain the tone property and contrast in the projection image and versatile luminance corrections in the edge blending in the multi-projection and the projection mapping.

The first and second light modulation elements described in the first to third embodiments can use a transmission type liquid crystal panel, a digital micro mirror device, etc. When the digital micro mirror device is used, a total reflection prism and a folding mirror etc. can be used instead of a PBS.

While the third embodiment uses the first light modulation element for the three second light modulation element, the first light modulation may be provided for each second light modulation element or the three first light modulation elements may be provided.

The first to third embodiments describe the luminance correction for the edge blending and the luminance correction based on the reflectance for each area on the three-dimensional object in the projection mapping. However, the purpose of the luminance correction is not limited, and the present invention may provide the luminance correction for reducing the uneven brightness on the projection surface caused by the optical system in the projector.

For example, the uneven brightness often occurs when the aperture in the diaphragm is narrowed in the optical system and thus the luminance correcting image may be formed on the first light modulation element based on the aperture degree in the diaphragm. In addition, the uneven brightness caused by the reduced peripheral light quantity in the projection lens is likely to occur in a wide-angle lens having a wide angle of view. The wide-angle lens causes the light incident angle to be larger on the projection surface. The reflectance of the three-dimensional object also becomes influential in the projection mapping onto the three-dimensional object described in the second embodiment. Therefore, the first light modulation element may form the luminance correcting image used to correct it. Even in this case, the luminance correction is unnecessary for the main image that depends on the input image signal, the tone property and contrast are restrained from lowering in the projection image, and the versatile luminance correction can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, while the above embodiments provide the first driver 51 and the second driver 52 separately but the first driver 51 and the second driver 52 may be integrated or one driver may serve as both the first driver 51 and the second driver 52.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processing units (e.g., central processing unit (CPU), micro processing unit (MPU)) and may include a network of separate computers or separate processing units to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2017-154903, filed on Aug. 10, 2017, which is hereby incorporated by reference herein in its entirety.

The invention claimed is:

1. An image projection apparatus comprising:
    an image signal inputter configured to input an image signal;
    a first light modulation panel configured to modulate light emitted from a light source and incident on the first light modulation panel;
    a second light modulation panel configured to modulate light exited from the first light modulation panel and incident on the second light modulation panel;
    an optical system configured to guide a projection image in which an image formed by the light modulated by the first light modulation panel and an image formed by the light modulated by the second light modulation panel are superimposed on each other to a projection optical system;
    a first driver configured to drive one of the first and second light modulation panels based on the image signal; and
    a second driver configured to drive the other of the first and second light modulation panels based on a luminance correction data irrelevant to the image signal.

2. The image projection apparatus according to claim 1, wherein the second light modulation panel is the one of the first and second light modulation panels, and the first light modulation panel is the other of the first and second light modulation panels.

3. The image projection apparatus according to claim 1, wherein the luminance correction data irrelevant to the image signal provides a change of a luminance in which a luminance of an image peripheral part is lower as a position is closer to an image edge, and
    wherein the second driver is configured to drive the other of the first and second light modulation panels so as to form an image having the change of the luminance in the other of the first and second light modulation panels.

4. The image projection apparatus according to claim 3, further comprising an image capturer configured to capture an image of the projection surface,
    wherein the second driver is configured to acquire the luminance correction data irrelevant to the image signal by using an output from the image capturer.

5. The image projection apparatus according to claim 3, further comprising a memory configured to store the luminance correction data irrelevant to the image signal,
    wherein the second driver is configured to acquire the luminance correction data irrelevant to the image signal from the memory.

6. The image projection apparatus according to claim 1, wherein the luminance correction data irrelevant to the image signal depends on a luminance or reflectance for each area on a projection surface, and
    wherein the second driver is configured to drive the other of the first and second light modulation panels so as to change a luminance distribution in the image formed by the other of the first and second light modulation panels depending on the luminance or reflectance for each area on the projection surface.

7. The image projection apparatus according to claim 1, wherein the image signal includes a color difference signal and a luminance signal, and
    wherein the second driver drives the other of the first and second light modulation panels by using the luminance correction data irrelevant to the image signal and the luminance signal acquired from the image signal.

* * * * *